(12) United States Patent
Yamakawa

(10) Patent No.: US 6,236,418 B1
(45) Date of Patent: May 22, 2001

(54) IMAGE FORMING APPARATUS AND METHOD TO CORRECT MAGNIFICATION ERROR CAUSED BY OPTICAL CHARACTERISTICS OF IMAGE WRITING DEVICE

(75) Inventor: Takeshi Yamakawa, Fujisawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/439,994

(22) Filed: Nov. 15, 1999

(30) Foreign Application Priority Data

Nov. 16, 1998 (JP) .................................................. 10-325032

(51) Int. Cl.⁷ ............................. B41J 2/385; G03G 13/04
(52) U.S. Cl. ........................... 347/129; 347/250; 399/196
(58) Field of Search ..................................... 347/129, 132, 347/247, 250; 399/51, 196, 197, 200; 358/448, 449, 451

(56) References Cited

U.S. PATENT DOCUMENTS

| | | | |
|---|---|---|---|
| 4,789,879 | * 12/1988 | Murakami | 399/196 |
| 5,309,205 | * 5/1994 | Hayano . | |
| 5,398,101 | * 3/1995 | Takada et al. | 399/196 X |
| 5,450,211 | * 9/1995 | Kanai et al. | 358/451 X |
| 5,933,266 | * 8/1999 | Minakuchi | 347/250 |
| 5,940,663 | * 8/1999 | Mizunuma et al. | 399/196 X |

FOREIGN PATENT DOCUMENTS

| | | |
|---|---|---|
| 6-227037 | 8/1994 | (JP) . |
| 7-177313 | 7/1995 | (JP) . |
| 9-11538 | 1/1997 | (JP) . |
| 9-66630 | 3/1997 | (JP) . |

* cited by examiner

Primary Examiner—Sandra L. Brase
(74) Attorney, Agent, or Firm—Oblon, Spivak, McClelland, Maier & Neustadt, P.C.

(57) ABSTRACT

An image forming apparatus and method wherein a writing device writes information of an image on a photoconductive body traveling in the sub-scanning direction to form an electrostatic latent image of the image thereupon by driving a light source to emit luminous flux, in response to an image signal corresponding to the image information, using a write clock and scanning the luminous flux from the light source with a scanning device in the main scanning direction on the photoconductive drum. The electrostatic latent image on the photoconductive body is developed by a developing device to a toner image, a transfer sheet having a size in the main scanning direction is selected by a selecting device, and the toner image on the photoconductive body is transferred by a transfer device to the selected transfer paper. The write clock is reset on the basis of information of the size of the selected transfer paper in the main scanning direction such that a magnification error of the writing device in the main scanning direction of the image is corrected.

33 Claims, 5 Drawing Sheets

IMAGE FORMING APPARATUS AND METHOD TO CORRECT MAGNIFICATION ERROR CAUSED BY OPTICAL CHARACTERISTICS OF IMAGE WRITING DEVICE

CROSS REFERENCE TO RELATED APPLICATIONS

This application claims benefit of priority under 35 USC §119 to Japanese Patent Application No. 10-325032 filed in the Japanese Patent Office on Nov. 16, 1998, the entire contents of which are incorporated herein by reference.

BACKGROUND OF THE INVENTION

1. Field of the Invention

The present invention relates to an image forming apparatus such as a digital copying machine, a digital printer, or a digital facsimile, and more particularly to a writing device to write image information on a photoconductive body to form an electrostatic latent image of an image thereupon by scanning luminous flux, emitted by a light source in response to an image signal of the image information, in a main scanning direction on the photoconductive body using a scanning device.

2. Discussion of the Background

A digital image forming apparatus includes a writing device to write image information on a surface of a photoconductive body traveling in a sub-scanning direction to form an electrostatic latent image of an image thereupon by driving a laser light source to emit luminous flux in response to an image signal corresponding to the image information using a write clock and scanning the luminous flux from the light source in a main scanning direction on the photoconductive body using a scanning device such as a rotary polygon mirror. The apparatus includes a developing device to develop the electrostatic latent image on the photoconductive body to a toner image and a transfer device to transfer the toner image on the photoconductive body onto a selected transfer paper.

In such a digital image forming apparatus, a magnification error in the main scanning direction is generally caused by an optical error in the writing device, a write clock error, an expansion or contraction of a transfer paper or other various causes. In order to correct such a magnification error in the main scanning direction caused by the optical characteristic of the writing device, some apparatuses use a variable write clock for driving a light source to emit luminous flux in response to an image signal. In such apparatuses, an expansion or contraction of an image due to an optical error of the writing device is measured and the write clock is adjusted according to a result of the measurement of the error such that the formed image has a predetermined length in the main scanning direction. The write clock adjusted and determined as described above is fixed other than when a further adjustment by a serviceman or other personnel is required.

An exemplary example of a digital image forming apparatus of a digital copying machine is described below. A digital copying machine shown in FIG. 4 has an image reader 11 as an image reading device, a printer section 12 as an image forming section, and an automatic document feeder 13. The automatic document feeder 13 conveys documents which have been set therein one by one onto a contact glass 14 and then discharges the document on the contact glass 14 after reading an image of the document.

The image reader 11 has a first carriage equipped with a light source including a lighting lamp 15 and a reflecting mirror 16 and a first mirror 17, a second carriage equipped with a second mirror 18 and a third mirror 19, a filter 20, a lens 21, and a line sensor 22 including a CCD as an imaging element.

When the image reader 11 reads an image of a document, the image of the document on the contact glass 14 is optically scanned by a travel of the first carriage at a fixed speed and a travel of the second carriage following the first carriage at a half speed thereof while the contact glass 14 is lighted by the lighting lamp 15 and the reflecting mirror 16, by which a reflected light image is formed on the line sensor 22 by the lens 21 via the first mirror 17, the second mirror 18, the third mirror 19, and the filter 20.

The line sensor 22 photo-electrically converts the formed reflected light image of the document into electrical signals and outputs analog image signals, so that the image of the document is read. An ND filter is used as the filter 20 to read a single-color image. After a completion of reading the image of one sheet of the document, the first and second carriages return to a home position.

As the filter 20, it is also possible to use red, green and blue color filters and sequentially change these three color filters in successive image readings so as to obtain red, green, and blue analog image signals sequentially from the line sensor 22. Furthermore, it is possible to use a 3-line CCD having red, green, and blue color filters as the line sensor 22.

The analog image signals from the line sensor 22 are converted to digital image signals by an analog-to-digital converter (not shown), subjected to various image processing, such as conversion processing from multi-level values to bi-level values, gradation processing, magnification processing, editing processing, etc., with an image processing board 23 as an image processing device, and sent to a semiconductor driving board (not shown).

While a photoconductive drum, for example, is used for an image carrier 25 as a photoconductive body in the printer section 12, a photoconductive belt or the like can be used. In a copying operation, the photoconductive drum 25 is driven to rotate by a driving section (not shown), charged uniformly by a charging device 26, and exposed to laser beams by a laser beam scanner 27, by which a latent image is formed on the surface of the photoconductive drum 25. In this operation, the laser beam scanner 27 exposes the photoconductive drum 25 to laser beams from a semiconductor laser (not shown) driven by the foregoing semiconductor driving board in response to the digital image signals from the image processing board 23, and the photoconductive drum 25 travels in the sub-scanning direction in a position where the latent image is written by the laser beam scanner 27, by which the latent image of each single line of the image is formed on the photoconductive drum 25 at an equal interval from each other in the sub-scanning direction. The electrostatic latent image on the photoconductive drum 25 is developed by a developing device 28 so as to be a toner image.

A transfer paper is fed to a registration roller 36 as a selected transfer paper from a feeder selected out of feeders 33 to 35 by a selecting device such as an operating section (not shown), or a transfer paper having a size selected by the selecting device or an automatic paper selecting device (not shown) is fed to the registration roller 36 as a selected transfer paper from a feeder out of the feeders 33 to 35. The transfer paper is sent out by the registration roller 36 at such a timing to register with the toner image on the photoconductive drum 25.

The toner image on the photoconductive drum 25 is transferred to the transfer paper sent out from the registration roller 36 by a transfer device 30 and the transfer paper is separated from the photoconductive drum 25 by a separating device 31. The separated transfer paper is then conveyed by a conveying device 37 toward a fixing device 38. The image on the transfer paper conveyed by the conveying device 37 is fixed by the fixing device 38 and the transfer paper is then ejected onto a tray 39 as a copy. The photoconductive drum 25 is cleaned by a cleaning device 32 to remove residual toner therefrom after the transfer paper is separated from the photoconductive drum 25.

The laser beam scanner 27 includes, as illustrated in FIG. 5, a beam emitting unit 40 including a light source having a semiconductor laser, a collimating lens and an aperture, which are not shown. The semiconductor laser in the beam emitting unit 40 is driven by the foregoing semiconductor driving board in response to digital image signals from the image processing board 23 to emit luminous flux of a laser beam modulated by the digital image signals.

The laser beam from the semiconductor laser is changed to parallel luminous flux by the collimating lens in the beam emitting unit 40 and shaped to luminous flux having a certain shape by passing through the aperture in the beam emitting unit 40. The luminous flux is compressed in the sub-scanning direction by a cylindrical lens 41 and incident on a deflector 42 as a scanning device. A rotary polygon mirror having an accurate polygon shape is used as the deflector 42. The polygon mirror 42 is driven to rotate at a constant speed in a constant direction by a polygon motor 43.

The rotation speed of the polygon motor 43 depends upon a rotation speed of the photoconductive drum 25, a writing speed of the laser beam scanner 27, the number of planes of the polygon mirror 42, and the number of laser beams scanned simultaneously by the polygon mirror 42. The laser beam incident on the polygon mirror 42 from the cylindrical lens 41 is deflected by the polygon mirror 42 so as to be incident on an fθ lens 44. The laser beam is scanned in the main scanning direction by a rotation of the polygon mirror 42.

The fθ lens 44 converts the light deflected by the polygon mirror 42 so as to scan the surface of the photoconductive drum 25 at equiangular velocity. The laser beam from the fθ lens 44 forms an image on the photoconductive drum 25 via a reflecting mirror 45 and a dust-proof glass 46. The fθ lens 44 has an inclined surface correction function. The laser beam having passed through the fθ lens 44 is reflected by a synchronization detecting mirror 47 outside an image area and guided to a synchronization detecting sensor 48, which detects the laser beam from the synchronization detecting mirror 47 and generates a synchronization detecting signal. The above semiconductor driving board drives the semiconductor laser in the beam emitting unit 40 to emit luminous flux in response to the digital image signals from the image processing board 23 in synchronization with the synchronization detecting signal from the synchronization detecting sensor 48, and the synchronization detecting signal from the synchronization detecting sensor 48 is used as a timing reference to start writing image information of each single line of the image on the photoconductive drum 25 in the main scanning direction.

In the above digital copying machine, when an image is written on the photoconductive drum 25 with laser beams from the laser beam scanner 27, a magnification error in the main scanning direction is caused according to the characteristics of the lens 44 of the laser beam scanner 27.

SUMMARY OF THE INVENTION

Accordingly, the objects of this invention are to overcome the above-described and other problems, by providing a novel image forming apparatus and method that correct a magnification error in the main scanning direction, which is caused by a writing device, such that an image having no magnification error in the main scanning direction is formed.

These and other objects are achieved according to a first aspect of the present invention, by providing a new and improved image forming apparatus which includes a writing device configured to write image information on a photoconductive body traveling in the sub-scanning direction so as to form an electrostatic latent image of an image thereupon by driving a light source to emit luminous flux, in response to an image signal corresponding to the image information, using a write clock and scanning the luminous flux from the light source with a scanning device in the main scanning direction on the photoconductive drum. The image forming apparatus further includes a developing device to develop the electrostatic latent image on the photoconductive body to a toner image, a selecting device to select a transfer sheet having a size in the main scanning direction and a transfer device to transfer the toner image on the photoconductive body to the selected transfer paper. The write clock is reset on the basis of information of the size of the selected transfer paper in the main scanning direction such that a magnification error in the main scanning direction of the image is corrected.

According to another aspect of the present invention, the above image forming apparatus includes a synchronization detecting sensor to detect the luminous flux from the scanning device for each line of the image at a predetermined position so as to generate a synchronization detecting signal for the luminous flux for each line of the image, and a timing of starting to write the image information for each line of the image on the photoconductive body, after detecting the synchronization detecting signal from the synchronization detecting sensor, is corrected in accordance with the reset write clock such that the write start position of each line of the image is aligned with each other on the photoconductive body.

According to still another aspect of the present invention, in the above image forming apparatus, the write clock is reset on the basis of predetermined information of a magnification error characteristics of the writing device such that a high magnification precision is obtained at positions corresponding to the vicinity of ends of the selected transfer paper in the main scanning direction.

According to a further aspect of the present invention, in the above image forming apparatus, the write clock is reset considering a correction value for the write clock, which has been initially set for correcting an initial magnification error in the main scanning direction of the image.

According to yet another aspect of the present invention, there is provided an image forming apparatus including a writing device configured to write image information on a photoconductive body traveling in the sub-scanning direction so as to form an electrostatic latent image of an image thereupon by driving a light source to emit luminous flux, in response to an image signal corresponding to the image information, using a write clock and scanning the luminous flux from the light source in the main scanning direction on the photoconductive body with a scanning device. The image forming apparatus further includes a developing device to develop the electrostatic latent image on the photoconductive body to a toner image, a selecting device to select a transfer paper having a size in the main scanning direction and a transfer device to transfer the toner image on the photoconductive body to the selected transfer paper. The write clock is reset on the basis of information of a maximum image width of the image in the main scanning direction such that a magnification error in the main scanning direction of the image is corrected.

According to another aspect of the present invention, the preceding image forming apparatus includes a synchronization detecting sensor to detect the luminous flux from the scanning device for each line of the image at a predetermined position to generate a synchronization detecting signal for the luminous flux for each line of the image, and a timing of starting to write the image information of each line of the image on the photoconductive body, after detecting the synchronization detecting signal from the synchronization detecting sensor, is corrected in accordance with the reset write clock such that the write start position for each line of the image is aligned with each other on the photoconductive body.

According to another aspect of the present invention, in the preceding image forming apparatus, the write clock is corrected on the basis of predetermined information of a magnification error characteristics of the writing device such that a high magnification precision is obtained at positions corresponding to the vicinity of ends of the image having the maximum image width in the main scanning direction.

According to a further aspect of the present invention, in the preceding image forming apparatus, the write clock is reset considering a correction value for the write clock, which has been initially set for correcting an initial magnification error in the main scanning direction of the image.

According to a still further aspect of the present invention, the preceding image forming apparatus further includes an image reading device to read an image of a document. The image signal includes an image signal from the image reading device, and the information of a maximum image width of the image in the main scanning direction is recognized from the image signal from the image reading device for each page of the document and the write clock is reset on the basis of the information of the maximum image width of the image in the main scanning direction thus recognized.

According to another aspect of the present invention, in the preceding image forming apparatus, the image signal is stored in a memory once so that the information of a maximum image width of the image in the main scanning direction is recognized on the basis of the image signal stored in the memory.

BRIEF DESCRIPTION OF THE DRAWINGS

A more complete appreciation of the present invention and many of the attendants advantages thereof will be readily obtained as the same becomes better understood by reference to the following detailed description with accompanying drawings, wherein.

DETAILED DESCRIPTION OF THE PREFERRED EMBODIMENTS

Figure 1:
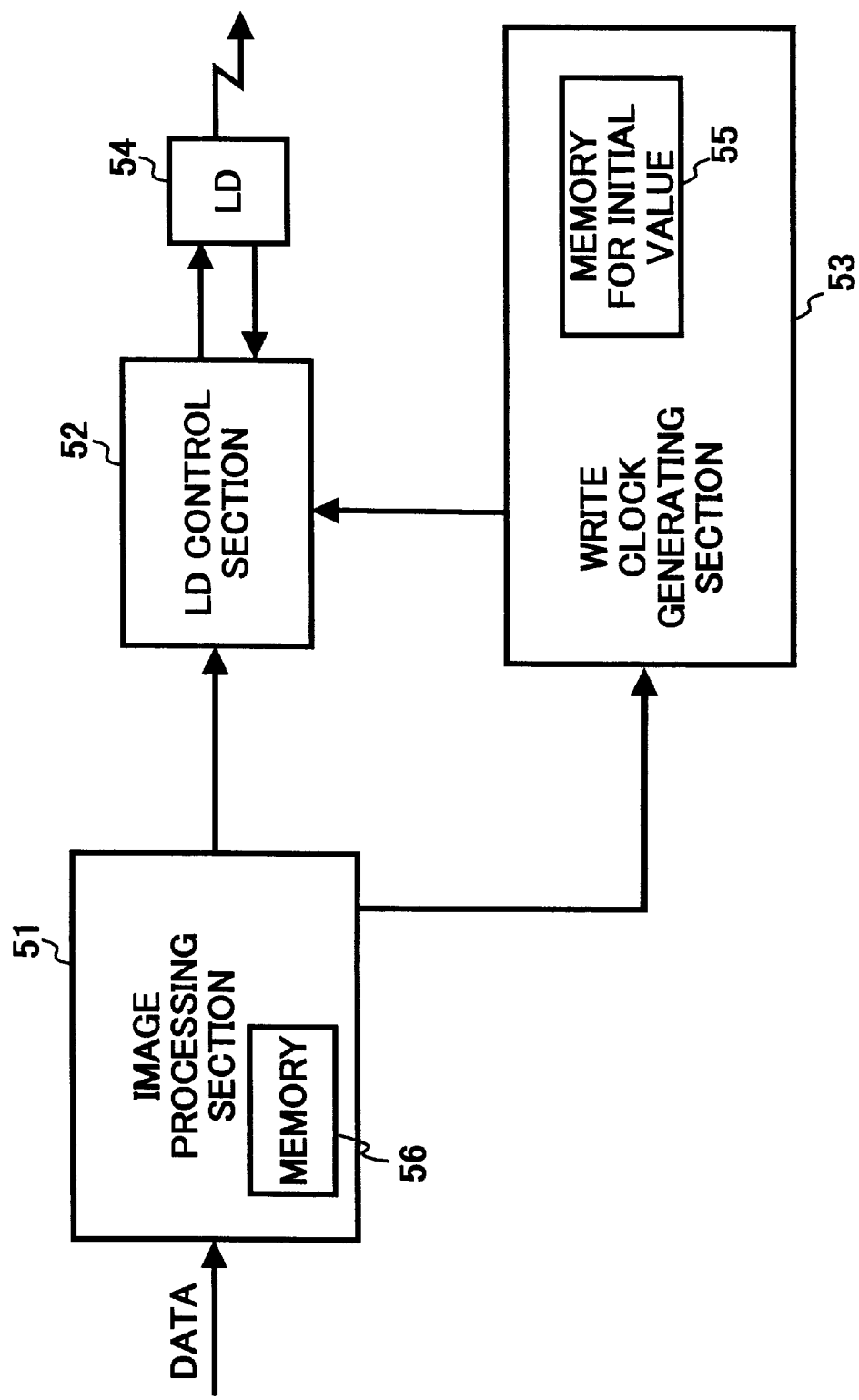
FIG. 1 is a block diagram of a part of a digital copying machine according to the first embodiment of the present invention.
Figure 4:
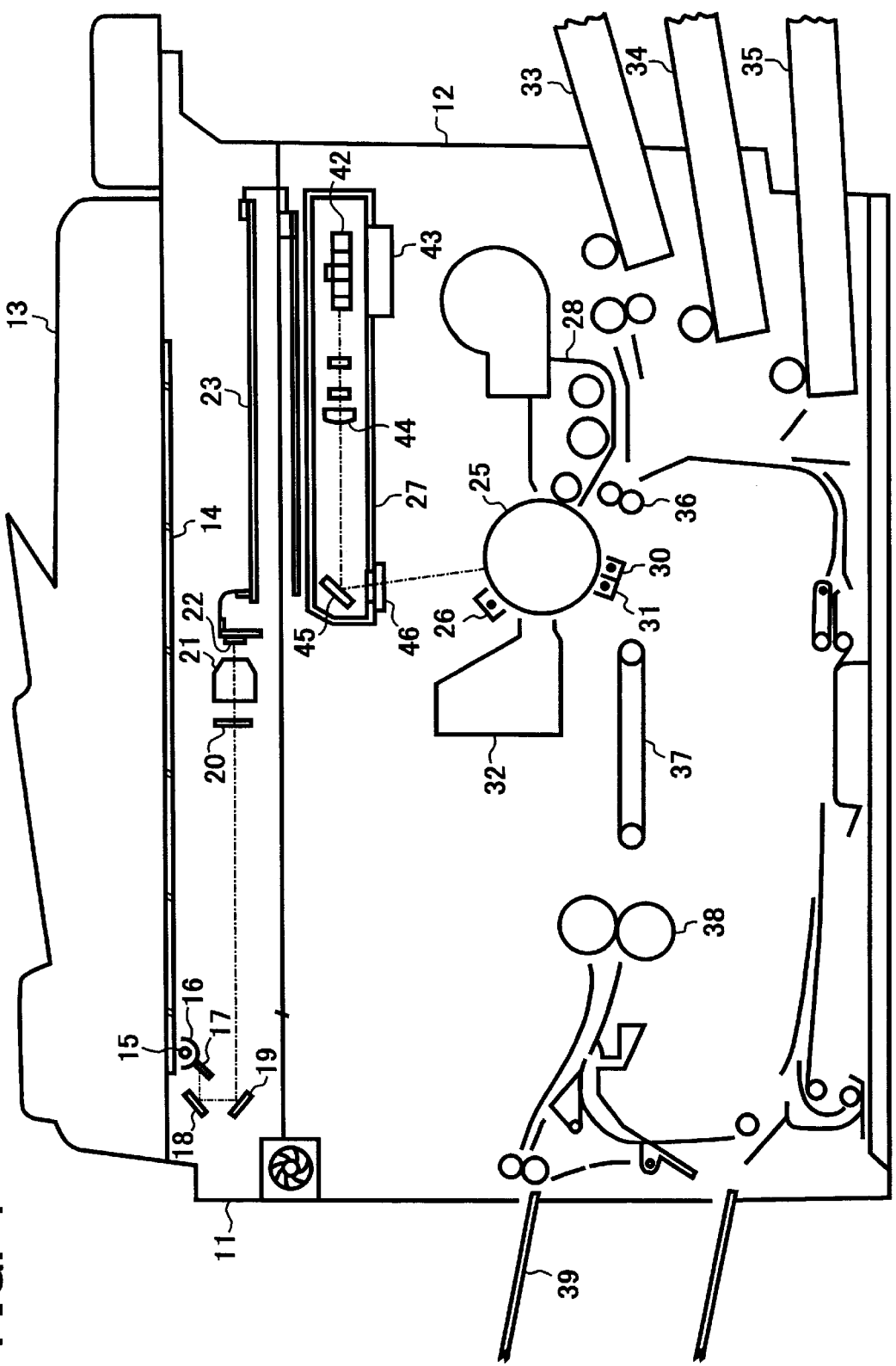
FIG. 4 is a schematic side view of an example of the digital copying machine.

Referring now to the drawings, where like reference numeral designations identify the same or corresponding parts throughout the several views, in FIG. 1, there is shown a part of a digital copying machine as an image forming apparatus according to the first embodiment of the present invention. In this first embodiment, the digital copying machine is configured as illustrated in FIG. 4 and as described above and includes as shown in FIG. 1 an image processing section 51 as an image processing device, used instead of the foregoing image processing board 23 of FIG. 4. The image processing section 51 performs various types of image processing, such as conversion processing from multi-level values to bi-level values, gradation processing, magnification processing, editing processing, etc., for digital image signals inputted from the line sensor 22 via the analog-to-digital converter, and sends the signals as writing data to the semiconductor laser control section 52 (hereinafter called LD control section 52) serving as a light source control section.

Figure 5:
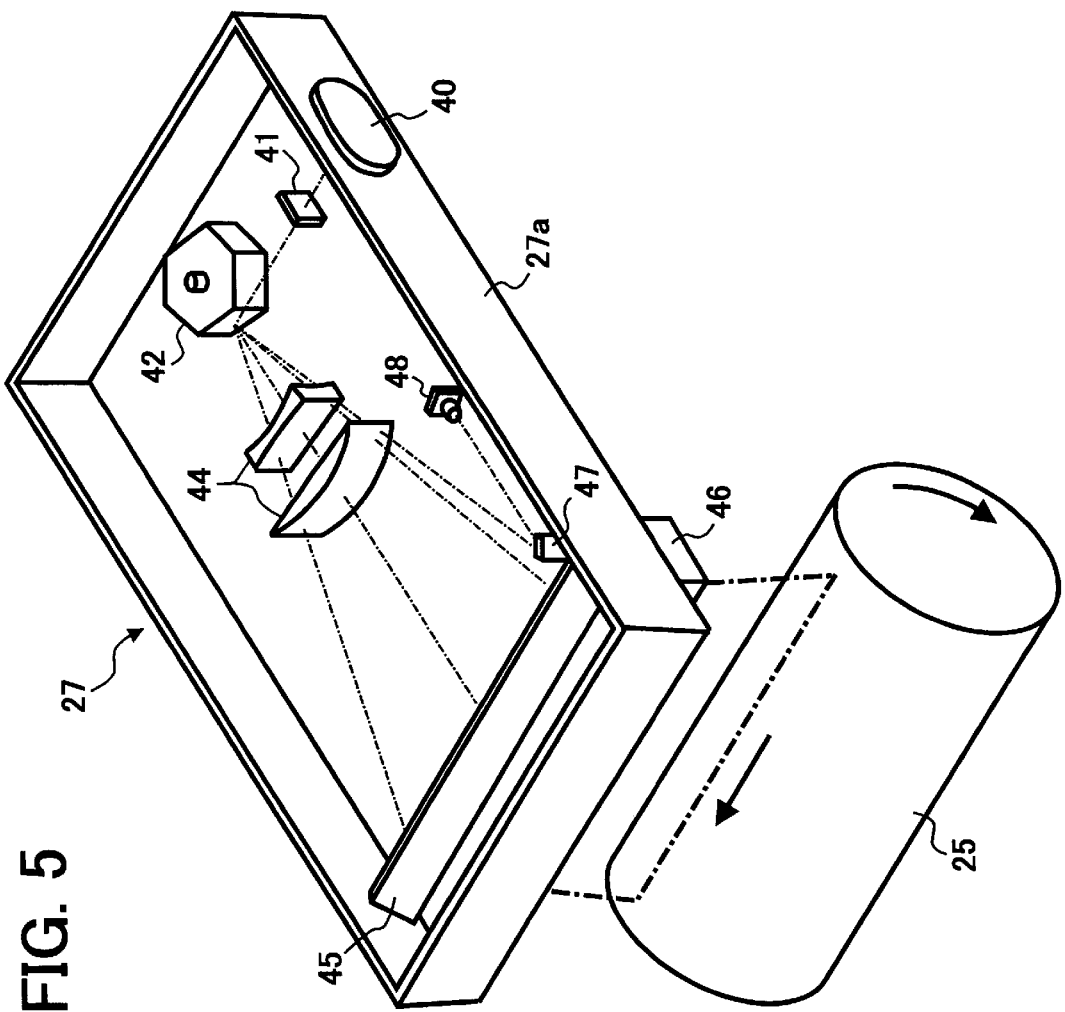
FIG. 5 is a perspective view of a laser beam scanner of the digital copying machine.

The LD control section 52 stores the writing data received from the image processing section 51 into a frame memory (not shown) once, and whenever a synchronization detecting signal is received from the synchronization detecting sensor 48 (FIG. 5), after a delay of a given time period, the LD control section 52 drives an LD (laser diode) 54 of the beam emitting unit 40 (FIG. 5) according to writing data for a single line of the image in the frame memory in synchronization with a write clock from a write clock generating section 53, by which the LD control section 52 emits laser beams modulated according to the writing data from the LD 54.

Figure 2:
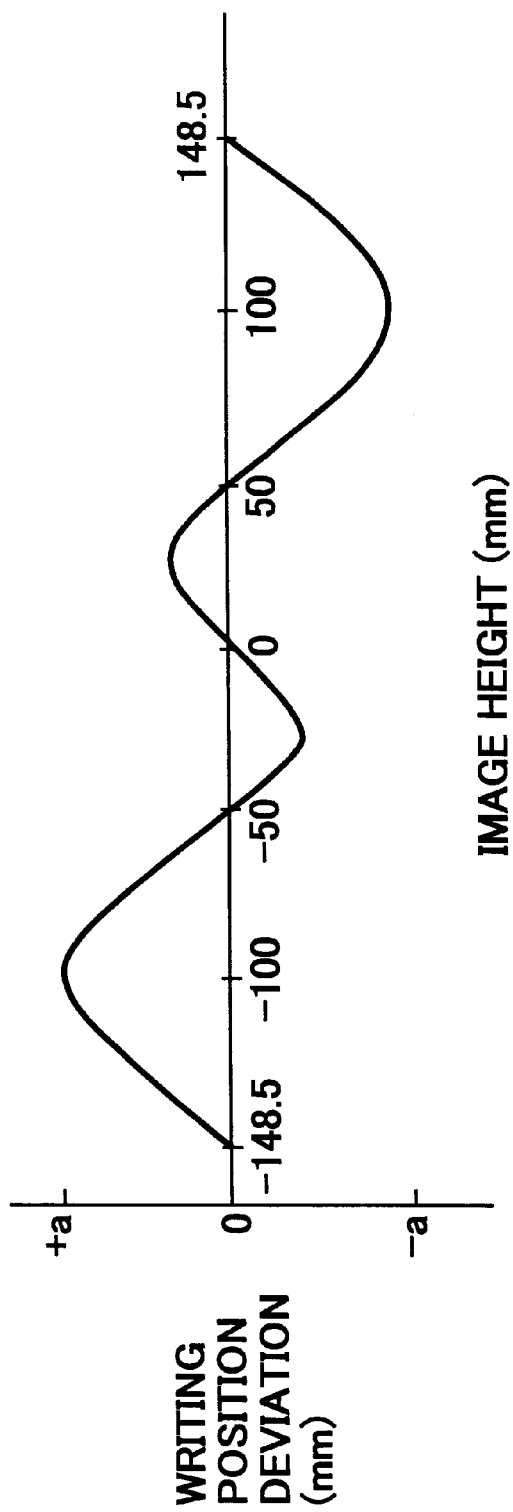
FIG. 2 is a diagram showing an example of a fθ characteristics (a magnification error characteristics) caused by the optical characteristics of a laser beam scanner of the digital copying machine of the first embodiment.
Figure 2:
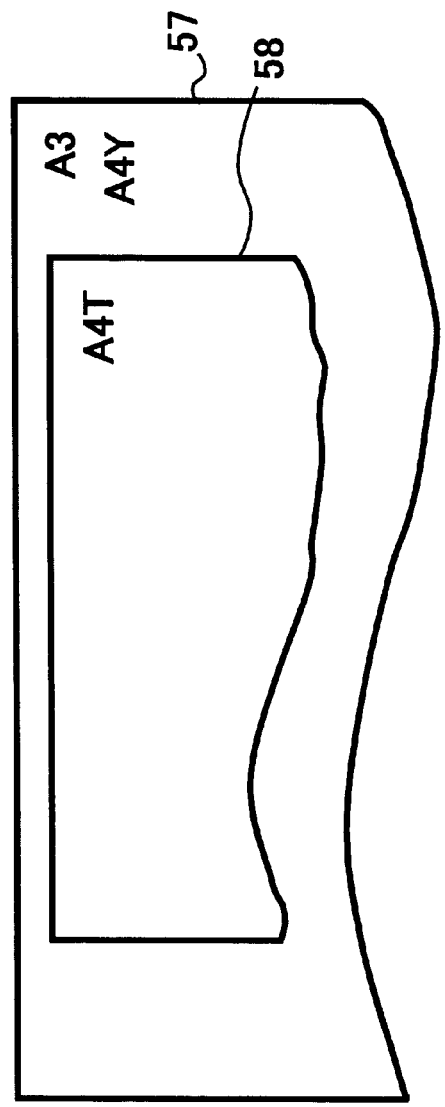

In this embodiment, the write clock (a frequency or a phase of the write clock) sent from the write clock generating section 53 to the LD control section 52 is determined on the basis of information on the maximum width in the main scanning direction of an image of a document read by the image reader 11. Referring to FIG. 2, there is shown an example of fθ characteristics (characteristics of a magnification error) caused by the optical characteristics of the laser beam scanner 27 and examples of transfer paper having respective sizes. In the fθ characteristics in FIG. 2, an ordinate axis indicates the deviation amount of a write position of the laser beam scanner 27 on the photoconductive drum 25 in the main scanning direction from the ideal write position and the abscissa axis indicates the image height in the main scanning direction of the image written on the photoconductive drum 25 by the laser beam scanner 27. The fθ characteristics in FIG. 2 indicates that the write position deviates from the ideal position in the main scanning direction by +a mm at the image height of −105 mm, for example.

As described above, in the fθ optical system having the fθ lens 44 of the laser beam scanner 27, there is an error in the position of a dot written on the photoconductive drum 25 by the laser beam scanner 27 in the main scanning direction according to an image height position, and the error leads to a magnification error for an image in the main scanning direction. The write position does not deviate in the position of an image height ±148.5 mm, because a write clock output from the write clock generating section 53 is adjusted such that the maximum width in the main scanning direction of an image to be formed on a transfer paper 57 having the width of the A3 size in the portrait orientation or the width of the A4 size in the landscape orientation has a predetermined size (generally, the same size as that of an image to formed).

The write clock adjusted such that the maximum width in the main scanning direction of an image formed on a transfer paper 57 having the width of the A3 size in the portrait orientation has a predetermined size (generally, the same size as that of an image to be formed) is stored in the memory 55 as an initial value and used as a correction value of a write clock value (a frequency or a phase) intrinsically thought in a theoretical manner. A length (the maximum width in the main scanning direction of an image formed on a transfer paper) to be used for such adjustment of the write clock varies depending on a machine, and the fθ characteristics shown in FIG. 2 is only an example.

If the write clock is adjusted, i.e., the frequency or the phase of the write clock is adjusted, as described above, an accurate magnification is obtained in the main scanning direction for an image having the maximum width in the main scanning direction, for example, an image having the width corresponding to the width of a transfer paper of A3 size in the portrait orientation. However, if an image having the maximum image width of 210 mm in the main scanning direction is formed in the center of the above A3 size transfer paper in the portrait orientation, for example, this image has a positional error of +a mm in the −105 mm position and of −a mm in the ±105 mm position in FIG. 2 with respect to the image height ±105 mm positions corresponding to the maximum image width in the main scanning direction of an image formed on a transfer paper 58 having the width of the A4 size in the portrait orientation. In other words, the image formed on the transfer paper 58 is contracted by 2a mm relative to the targeted maximum image width of 210 mm in the main scanning direction.

In this embodiment, the write clock generating section 53 includes a write clock generator (not shown) for generating a write clock and a write clock control section (not shown) for controlling the write clock generator to adjust the write clock (i.e., a frequency or a phase of the write clock). The write clock control section recognizes the maximum image width in the main scanning direction of an image of a document on the basis of information on the maximum image width in the main scanning direction of the document which has been inputted from the image processing section 51, and controls the write clock generator according to the recognized maximum image width in the main scanning direction of the image, by which the write clock (a frequency or a phase of the write clock) is corrected according to the maximum image width in the main scanning direction of the image so as to be reset. By this operation, the write clock is corrected such that a magnification error due to the optical characteristics of the laser beam scanner 27 is corrected and thereby a magnification in the main scanning direction becomes accurate for the maximum image width of the image in the main scanning direction.

More specifically, the clock control section of the write clock generating section 53 stores in the memory, in advance, information of a magnification error characteristics of the laser beam scanner 27 according to the optical characteristics of the laser beam scanner 27 as shown in FIG. 2, i.e., information of a relationship between a write position error and an image height on the photoconductive drum 25 of the laser beam scanner 27. The clock control section of the write clock generating section 53 refers to the above information of the magnification error on the basis of the information of the maximum image width in the main scanning direction of each document from the image processing section 51, and corrects an initial value of the write clock (an initial value of a frequency or a phase of the write clock) previously stored in the memory 55, according to the maximum image width in the main scanning direction of the image, i.e., according to the error in the write position at the image height corresponding to the maximum image width in the main scanning direction of the image, to control the write clock generator so as to generate the corrected write clock.

For example, when the transfer paper selected by the foregoing selecting device is one of the A4 size in the portrait orientation as described above, the write clock control section of the write clock generating section 53 recognizes that the transfer paper has the width of the A4 size in the portrait orientation by recognizing the maximum image width in the main scanning direction of the image on the basis of the information from the image processing section 51 on the maximum image width in the main scanning direction of each document, and controls the write clock generating section 53 to correct the write clock (a frequency or a phase of the write clock) such that the image is magnified 210/(210−2a) times and thereby an error of the magnification due to the optical characteristics of the laser beam scanner 27 is corrected such that a magnification in the main scanning direction of the image becomes accurate in a position corresponding to the maximum image width in the main scanning direction.

When the above correction of the write clock causes an increase of the magnification in the main scanning direction of the image, a write position where an image is started to be written on the photoconductive drum 25 in the main scanning direction deviates to a position distant from a synchronization detecting position with the synchronization detecting sensor 48, because the criterion position for the image expansion is the synchronization detecting position. Conversely, if the above correction of the write clock causes a decrease of the magnification in the main scanning direction of the image, the write position is shifted to a position closer to the synchronization detecting position.

Therefore, to align the write start position of each line of the image with each other in the sub-scanning direction on the photoconductive drum 25, the LD control section 52 has a correcting device (not shown) to correct the timing of driving the LD (laser diode) 54 of the beam emitting unit 40 in synchronization with a write clock from the write clock generating section 53. When the magnification in the main scanning direction of the image is to be corrected to "b" times as determined by the write clock control section of the write clock generating section 53, for example, a correction value for correcting the above timing is obtained on the basis of the information of "b" times using the following formula;

correction value=(distance from the synchronization detecting position to the write start position)×(1−$b$).

In other words, as described above, the LD control section 52 drives the LD 54 in the beam emitting unit 40 in synchronization with the write clock from the write clock generating section 53 according to writing data for a single line of the image in the frame memory after a delay of a predetermined time period. In this operation, the value of the predetermined time period is corrected by being multiplied by (1−b) on the basis of the information of "b" times from the write clock control section. The write clock for obtaining a predetermined magnification in the main scanning direction of the image is a little different from a theoretical value due to accumulated various errors. Therefore, before shipment of respective machines, in order to correct the difference, a write clock (a frequency or a phase of the write clock) is adjusted so that the magnification in the main scanning direction of an image is equal to a predetermined magnification, and the value of the adjusted write clock is stored in the memory 55 as an initial value. As described above, the initial value of the write clock adjusted as above is reset, by which the magnification in the main scanning direction can be corrected more precisely.

More specifically, assuming that "c" indicates a value of the magnification in the main scanning direction of the image which is set after correction of the write clock when an apparatus is shipped and "b" indicates a value of the magnification used for correcting a magnification error in the main scanning direction of the image caused by optical characteristics of the laser beam scanner 27 when a transfer paper having a certain size is selected by the foregoing selecting device, b×c is a correction amount for the magnification in the main scanning direction of the image.

The image processing section 51 detects the maximum width of an image in the main scanning direction for each page of a document which is read. The image processing section 51 once stores in the memory 56 digital image signals inputted from the line sensor 22 (FIG. 4) via the analog-to-digital converter and obtains information of the maximum width in the main scanning direction of the image for each page of the document on the basis of the image signals in the memory 56, outputs the information of the maximum width in the main scanning direction of the image to the write clock generating section 53, processes the image signals in the memory 56 and send them as writing data to the LD control section 52.

According to the above first embodiment of the present invention, there is provided an image forming apparatus including the laser beam scanner 27 as a writing device to write information of an image on the photoconductive drum 25 as a photoconductive body traveling in the sub-scanning direction to form an electrostatic latent image of the image thereupon by driving a semiconductor laser LD as a light source to emit luminous flux, in response to an image signal corresponding to the image information, using the write clock and scanning the luminous flux from the light source LD in the main scanning direction on the photoconductive drum 25 with the polygon mirror 42 as a scanning device. The image forming apparatus includes the developing device 28 to develop the electrostatic latent image on the photoconductive body 25 to a toner image, the selecting device to select a transfer paper having a size in the main scanning direction and the transfer device 30 as a transfer device to transfer the toner image on the photoconductive body 25 to a selected transfer paper. The write clock is reset on the basis of the maximum image width of the image in the main scanning direction such that a magnification error in the main scanning direction of the image is corrected, and therefore an error of the magnification in the main scanning direction caused by the writing device can be corrected to obtain an image having no magnification error in the main scanning direction.

According to another aspect of the first embodiment of the present invention, the above image forming apparatus includes the synchronization detecting sensor 40 for detecting luminous flux from the scanning device 42 for each line of the image at a predetermined position to generate a synchronization detecting signal for the luminous flux for each line of the image, and a timing of starting to write the image information for each line of the image on the photoconductive body 25 after detecting the synchronization detecting signal from the synchronization detecting sensor 40 is corrected in accordance with the reset write clock such that the write start position for each line of the image is aligned with each other on the photoconductive body 25, by which a start position of each line of the image can be aligned with each other in the sub-scanning direction on an transfer paper.

According to still another aspect of the first embodiment of the present invention, in the above image forming apparatus, the write clock is corrected on the basis of the predetermined information of a magnification error characteristics of the writing device 27 such that a high magnification precision is obtained at positions corresponding to the vicinity of ends of the selected transfer paper in the main scanning direction, by which the magnification in the main scanning direction of the image can be maintained precisely.

According to a further aspect of the first embodiment of the present invention, in the above image forming apparatus, the write clock is reset considering a correction value for the write clock, which has been initially set for correcting an initial magnification error in the main scanning direction of the image, by which the magnification error in the main scanning direction can be corrected more precisely.

According to a still further aspect of the first embodiment of the present invention, the above image forming apparatus further includes an image reader 11 configured to read an image of a document, and the foregoing image signal includes an image signal from the image reader 11. The information of the maximum image width of the image in the main scanning direction is recognized from the image signal from the image reader 11 for each page of the document and the write clock is reset on the basis of the information of the maximum image width of the image in the main scanning direction thus recognized, by which the magnification error in the main scanning direction can be corrected for each page of the document.

According to another aspect of the first embodiment of the present invention, in the above image forming apparatus, the foregoing image signal is stored in the memory 56 once so that the maximum image width of the image in the main scanning direction is recognized on the basis of the image signal stored in the memory 56, by which the maximum image width of the image in the main scanning direction can be recognized to correct the magnification error in the main scanning direction of the image.

Next a second embodiment of the present invention is described. A digital copying machine according to the second embodiment of the present invention is configured in substantially the same configuration as that of the first embodiment. In the second embodiment, the image reader 11 repeats the above image reading processing twice for each page of a document and the image processing section 51 detects the maximum width of an image of each page of the document in the main scanning direction at the first image reading for obtaining information of the maximum width of the image in the main scanning direction for each page of the document. The image reader 11 stores in the memory 56 a digital image signal inputted from the line sensor 22 via the analog-to-digital converter at the first image reading for a single page of the document, obtains the information of the maximum width of the image in the main scanning direction on the basis of the image signal in the memory 56 for each page of the document, outputs the information of the maximum width of the image in the main scanning direction to the write clock generating section 53, and processes a digital image signal, which is inputted from the line sensor 22 via the analog-to-digital converter at the second image reading for the single page of the document, before sending the digital signal as writing data to the LD control section 52.

According to the second embodiment of the present invention, in the above image forming apparatus, the foregoing image signal includes an image signal from the image reader 11 as an image reading device for reading an image of a document, so that the maximum image width of the image in the main scanning direction is recognized on the basis of an image signal obtained by pre-scanning of the document by using the image reading device 11, by which the maximum image width of the image in the main scanning direction can be recognized to correct a magnification error in the main scanning direction of the image.

Figure 3:
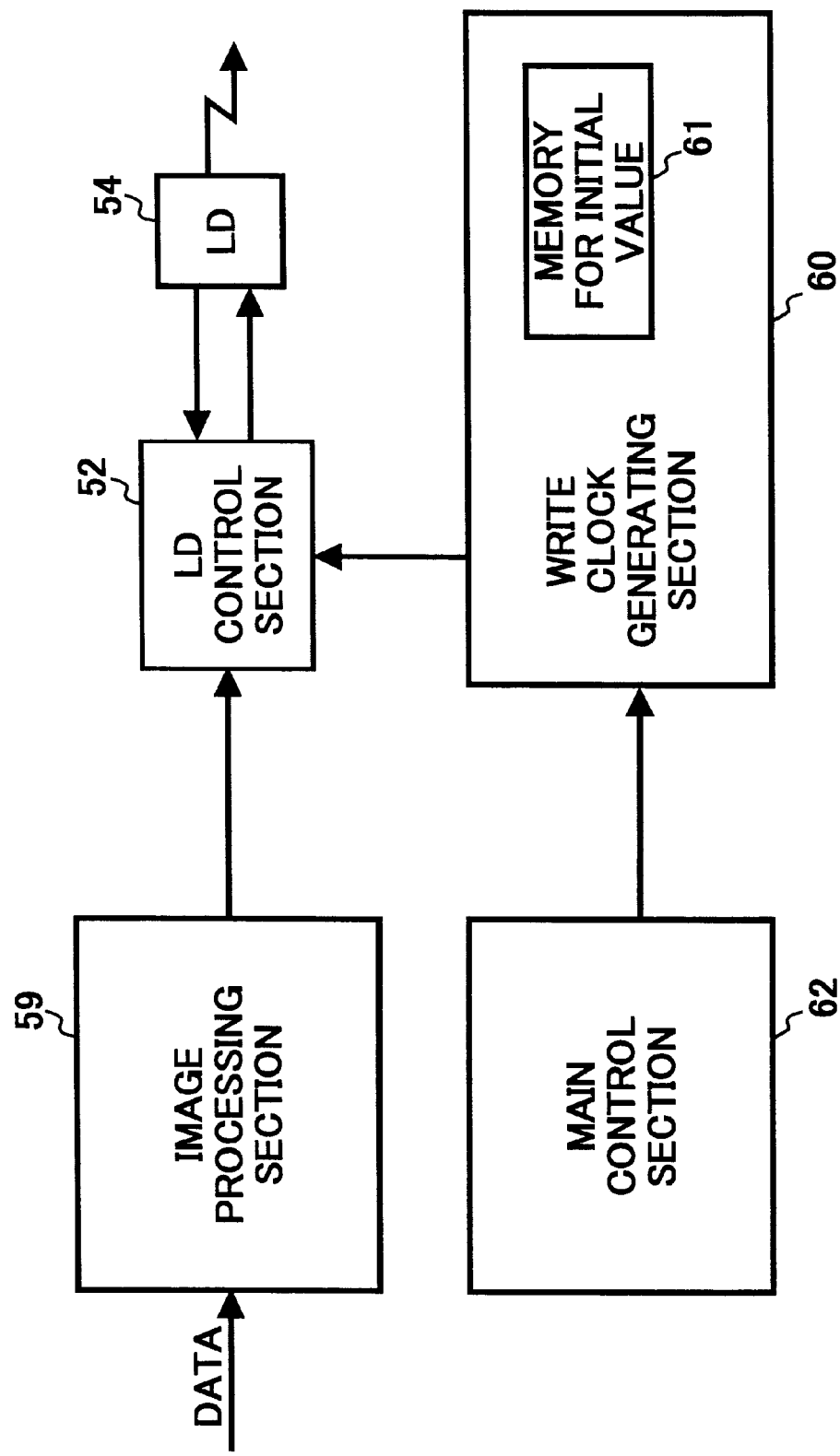
FIG. 3 is a block diagram of a part of a digital copying machine according to the third embodiment of the present invention.

Referring to FIG. 3, there is shown a part of a digital copying machine as an image forming apparatus according to the third embodiment of the present invention. In the third embodiment, the digital copying machine is configured as illustrated in FIG. 4 and as described above and includes a circuit system shown in FIG. 3. An image processing section 59 as an image processing device is used instead of the foregoing image processing section 51 of FIG. 1. The image processing section 59 performs various type of image processing, such as conversion processing from multi-level values to bi-level value, gradation processing, magnification processing, editing processing, etc. for the digital image signals inputted from the line sensor 22 via the analog-to-digital converter and sends the signals as writing data to the LD control section 52.

The LD control section 52 stores the writing data received from the image processing section 51 into a frame memory (not shown), and then whenever a synchronization detecting signal is inputted from the synchronization detecting sensor 48, after a delay of a given time period, the LD control section 52 drives an LD 54 in the beam emitting unit 40 in synchronization with a write clock from a write clock generating section 60 by using writing data for a single line in the frame memory, by which the LD control section 52 emits laser beams modulated according to the written data from the LD 54. In this embodiment, the write clock (a frequency or a phase of the write clock) sent from the write clock generating section 60 to the LD control section 52 is determined on the basis of information of the transfer paper selected by the foregoing selecting device. As described above, in the fθ optical system having the fθ lens 44 of the laser beam scanner 27, there is an error in a position of a dot written on the photoconductive drum 25 by the laser beam scanner 27 according to an image height position, and the error leads to a magnification error for an image in the main scanning direction. The write position does not deviate in the position of an image height ±148.5 mm, because a write clock output from the write clock generating section 60 is adjusted such that the maximum width in the main scanning direction of an image formed on a transfer paper 57 having the width of the A3 size in the portrait orientation or the width of the A4 size in the landscape orientation has a predetermined size (generally, the same size as that of an image to be formed).

The write clock adjusted such that the maximum width in the main scanning direction of an image formed on a transfer paper having the width of the A3 size in the portrait orientation has a predetermined size (generally, the same size as that of an image to be formed) is stored in the memory 61 as an initial value and used as a correction value of a write clock value (a frequency or a phase) intrinsically thought in a theoretical manner. A length (the maximum width in the main scanning direction of an image formed on a transfer paper) to be used for such adjustment of the write clock varies depending on a machine, and the fθ characteristics shown in FIG. 2 is only for an example.

If the write clock is adjusted as described above, an accurate magnification is obtained in the main scanning direction for an image having the maximum width in the main scanning direction, for example, an image having the width corresponding to the width of a transfer paper 57 of A3 size in the portrait orientation. However, if an image having the maximum image width of 210 mm in the main scanning direction is formed in the center of the above A3 size transfer paper 57 in the portrait orientation, for example, this image has a positional error of +a mm in the −105 mm position and of −a mm in the +105 mm position in FIG. 2 with respect to the image height +105 mm positions corresponding to the maximum image width in the main scanning direction of the image formed on a transfer paper 58 having the width of A4 size in the portrait position. In other words, the image formed on the transfer paper 58 is contracted by 2a mm relative to the targeted maximum image width of 210 mm in the main scanning direction.

In this embodiment, the write clock generating section 60 includes a write clock generator (not shown) for generating a write clock and a write clock control section (not shown) for controlling the write clock generator to adjust the write clock (i.e., adjust a frequency or a phase of the write clock). The write clock control section recognizes the size in the main scanning direction of a transfer paper selected by the forgoing selecting device on the basis of the information of the size in the main scanning direction of the transfer paper selected by the selecting device which has been inputted from the main control section 62, and controls the write clock generator according to the size in the main scanning direction of the recognized transfer paper, by which the write clock (a frequency or a phase of the write clock) is corrected according to the size in the main scanning direction of the transfer paper selected by the selecting device and the corrected write clock is set. By this operation, the write clock is corrected such that a magnification error due to the optical characteristics of the laser beam scanner 27 is corrected and thereby a magnification in the main scanning direction becomes accurate for the maximum image width of the image in the main scanning direction.

More specifically, the clock control section of the write clock generating section 60 stores in the memory, in advance, information of a magnification error characteristics of the laser beam scanner 27 according to the optical characteristics of the laser beam scanner 27 as shown in FIG. 2, i.e., information of a relationship between a write position error and an image height on the photoconductive drum 25 of the laser beam scanner 27. The clock control section of the write clock generating section 60 refers to the above information of the magnification error on the basis of the information of the size in the main scanning direction of the transfer paper selected by the selecting device from the main control section 62, and corrects an initial value of the write clock (an initial value of a frequency or a phase of the write clock) previously stored in the memory 61, according to the size in the main scanning direction of the transfer paper selected by the selecting device, i.e., according to the error in the write position in the image height corresponding to the size in the main scanning direction of the selected transfer paper, to control the write clock generator so as to generate the corrected write clock.

For example, when the transfer paper selected by the foregoing selecting device is one of the A4 size in the portrait orientation as described above, the write clock control section of the write clock generating section 60 recognizes that the transfer paper selected by the selecting device has the width of the A4 size in the portrait orientation on the basis of the information of the size in the main scanning direction of the transfer paper selected by the selecting device from the main control section 62, and controls the write clock generating section 60 to correct the write clock (a frequency or a phase of the write clock) such that the image is magnified 210/(210−2a) times and thereby an error of the magnification due to the optical characteristics of the laser beam scanner 27 is corrected such that a magnification in the main scanning direction of the image becomes accurate in a position corresponding to the maximum image width in the main scanning direction.

When the above correction of the write clock causes an increase of the magnification in the main scanning direction of the image, a write position where the image is started to be written on the photoconductive drum 25 in the main scanning direction deviates to a position distant from a synchronization detecting position of the synchronization detecting sensor 48, because the criterion position for the image expansion is the synchronization detecting position. Conversely, when the above correction of the write clock causes a decrease of the magnification in the main scanning direction of the image, the write position is shifted to a position closer to the synchronization detecting position.

Therefore, to align the write start position of each line of the image with each other in the sub-scanning direction on the photoconductive drum 25, when the magnification in the main scanning direction of the image is to be corrected by "b" times as determined by the write clock control section of the write clock generating section 60 by the above write clock correction, the LD control section 52 corrects a timing of driving the LD 54 on the basis of the information of "b" times by using the following formula in the same manner as for the first embodiment;

correction value=(distance from the synchronization detecting position to the write start position)×(1−*b*).

In other words, the LD control section 52 drives the LD 54 in the beam emitting unit 40 in synchronization with the write clock from the write clock generating section 60 according to writing data for a single line of the image in the frame memory after a delay of a predetermined time period. In this operation, the value of the predetermined time period is corrected by being multiplied by (1−b) on the basis of the information of "b" times from the write clock control section.

According to the third embodiment of the present invention, there is provided an image forming apparatus including a laser beam scanner 27 as a writing device to write information of an image on a photoconductive drum 25 traveling in the sub-scanning direction so as to form an electrostatic image of the image thereupon by driving the LD 54 as a light source to emit luminous flux, in response to an image signal corresponding to the image information, using the write clock and scanning the luminous flux from the light source 54 in the main scanning direction on the photoconductive drum 25 with the polygon mirror 42 as a scanning device. The image forming apparatus includes the developing device 28 for developing the electrostatic latent image on the photoconductive body 25 to a toner image, the selecting device to select a transfer paper having a size in the main scanning direction and the transfer device 30 as a transfer device for transferring the toner image on the photoconductive body 25 to a selected transfer paper. The write clock is reset on the basis of information of the size of the selected transfer paper in the main scanning direction such that a magnification error of the writing device in the main scanning direction of the image is corrected, and therefore an error of the magnification in the main scanning direction caused by the writing device can be corrected to obtain an image having no magnification error in the main scanning direction.

According to another aspect of the third embodiment of the present invention, the above image forming apparatus includes the synchronization detecting sensor 40 for detecting luminous flux from the scanning device 42 for each line of the image at a predetermined position to generate a synchronization detecting signal for the luminous flu for each line of the image, and a timing of starting to write the image information for each line of the image on the photoconductive body 25 after detecting the synchronization detecting signal from the synchronization detecting sensor 40 is corrected in accordance with the reset write clock such that the write start position for each line of the image is aligned with each other on the photoconductive body 25, by which a start position of each line of the image can be aligned with each other on a transfer paper.

According to still another aspect of the third embodiment of the present invention, in the above image forming apparatus, the write clock is reset on the basis of predetermined information of a magnification error characteristics of the writing device 27 such that a high magnification precision is obtained at positions corresponding to vicinity of ends of the selected transfer paper in the main scanning direction, by which the magnification in the main scanning direction of the image can be maintained precisely.

According to a further aspect of the third embodiment of the present invention, in the above image forming apparatus, the write clock is corrected considering a correction value for the write clock, which has been initially set for correcting an initial magnification error in the main scanning direction of the image, by which the magnification in the main scanning direction of the image can be corrected more precisely.

The present invention is not limited to the above embodiments, but it is applicable to a digital facsimile, a digital printer, or other image forming apparatuses, for example.

Numerous additional modifications and variations of the present invention are possible in light of the above teachings. It is therefore to be understood that within the scope of the appended claims, the present invention may be practiced otherwise than as specifically described herein.

What is claimed as new and desired to be secured by Letter Patent of the United States is:

1. An image forming apparatus, comprising:
   a writing device including a light source and a scanning device, configured to write image information of an image on a photoconductive body traveling in a sub-scanning direction so as to form an electrostatic latent image of an image thereupon by driving the light source to emit luminous flux in response to an image signal corresponding to the image information using a write clock and scanning the luminous flux from the light source with the scanning device in a main scanning direction on the photoconductive body;
   a developing device configured to develop the electrostatic latent image on the photoconductive body to a toner image;

a selecting device configured to select a transfer paper having a size in the main scanning direction;

a transfer device configured to transfer the toner image on the photoconductive body to the selected transfer paper; and a write clock reset mechanism configured to reset the write clock on the basis of information of the size of the selected transfer paper in the main scanning direction such that a magnification error of the writing device in the main scanning direction of the image is corrected.

2. An image forming apparatus according to claim 1, further comprising:

a synchronization detecting sensor configured to detect the luminous flux from the scanning device for each line of the image at a predetermined position and to generate a synchronization detecting signal for the luminous flux for each line of the image; and a write start correction mechanism configured to correct a timing of starting to write the image information of each line of the image on the photoconductive body after detecting the synchronization detecting signal from the synchronization detecting sensor in accordance with the reset write clock such that a write start position for each line of the image is aligned with each other on the photoconductive body.

3. An image forming apparatus according to claim 1, wherein the write clock reset mechanism is configured to reset the write clock on the basis of predetermined information of a magnification error characteristics of the writing device to obtain magnification precision at positions corresponding to vicinity of ends of the selected transfer paper in the main scanning direction.

4. An image forming apparatus according to claim 1, wherein the write clock reset mechanism is configured to reset the write clock taking into consideration a correction value for the write clock, which has been initially set for correcting an initial magnification error in the main scanning direction of the image.

5. An image forming apparatus, comprising:

a writing device including a light source and a scanning device, configured to write image information on a photoconductive body traveling in a sub-scanning direction so as to form an electrostatic image of an image thereupon by driving the light source to emit luminous flux in response to an image signal corresponding to the image information using a write clock and scanning the luminous flux from the light source with the scanning device in a main scanning direction on the photoconductive body;

a developing device configured to develop the electrostatic latent image on the photoconductive body to a toner image;

a selecting device configured to select a transfer paper having a size in the main scanning direction;

a transfer device configured to transfer the toner image on the photoconductive body to the selected transfer paper; and a write start correction mechanism configured to reset the write clock based on an error in a write position at an image height corresponding to a maximum image width of the image in the main scanning direction such that a magnification error of the writing device in the main scanning direction of the image is corrected.

6. An image forming apparatus according to claim 5, further comprising:

a synchronization detecting sensor configured to detect the luminous flux from the scanning device for each line of the image at a predetermined position to generate a synchronization detecting signal for the luminous flux for each line of the image; and a write start correction mechanism configured to correct a timing of starting to write the image information of each line of the image on the photoconductive body after detecting the synchronization detecting signal from the synchronization detecting sensor in accordance with the reset write clock such that a write start position for each line of the image is aligned with each other on the photoconductive body.

7. An image forming apparatus according to claim 5, wherein write clock reset mechanism is configured to reset the write clock on the basis of predetermined information of a magnification error characteristics of the writing device to obtain magnification precision at positions corresponding to vicinity of ends of the image having the maximum image width in the main scanning direction.

8. An image forming apparatus according to claim 5, wherein the write clock reset mechanism is configured to reset the write clock taking into consideration a correction value for the write clock, which has been initially set for correcting an initial magnification error in the main scanning direction of the image.

9. An image forming apparatus according to claim 5, further comprising:

an image reading device configured to read an image of a document to produce said image signal; and the write clock reset mechanism configured to recognize in the image signal from the image reading device, the information of a maximum image width of the image in the main scanning direction for each page of the document and reset the write clock on the basis of the information of the maximum image width of the image in the main scanning direction recognized from the image signal from the image reading device for each page of the document.

10. An image forming apparatus according to claim 5, further comprising:

an image reading device to pre-scan and read an image of a document; and the write clock reset mechanism configured to recognize the information of a maximum image width of the image in the main scanning direction on the basis of an image signal obtained by pre-scanning and reading of the document with the image reading device.

11. An image forming apparatus according to claim 5, comprising a memory configured to store the image signal once and the information of a maximum image width of the image in the main scanning direction is recognized on the basis of the image signal stored in the memory.

12. An image forming apparatus, comprising:

means including a light source and a scanning device for writing image information on a photoconductive body traveling in a sub-scanning direction so as to form an electrostatic latent image of an image thereupon by driving the light source to emit luminous flux in response to an image signal corresponding to the image information using a write clock and scanning the luminous flux from the light source with the scanning device in a main scanning direction on the photoconductive body;

a developing device configured to develop the electrostatic latent image on the photoconductive body to a toner image;

a selecting device configured to select transfer paper having a size in the main scanning direction;

a transfer device configured to transfer the toner image on the photoconductive body to the selected transfer paper; and write clock reset means for resetting the write clock on the basis of information of the size of the selected transfer paper in the main scanning direction such that a magnification error of the writing means in the main scanning direction of the image is corrected.

13. An image forming apparatus according to claim 12, further comprising:

means for detecting the luminous flux from the scanning device for each line of the image at a predetermined position to generate a synchronization detecting signal for the luminous flux for each line of the image; and means for correcting a timing of starting to write the image information for each line of the image on the photoconductive body after detecting the synchronization detecting signal from the detecting means in accordance with the reset write clock such that a write start position for each line of the image is aligned with each other on the photoconductive body.

14. An image forming apparatus according to claim 12, wherein the write clock reset means resets the write clock on the basis of predetermined information of a magnification error characteristics of the writing means to obtain magnification precision at positions corresponding to vicinity of ends of the selected transfer paper in the main scanning direction.

15. An image forming apparatus according to claim 12, wherein the write clock reset means resets the write clock taking into consideration a correction value for the write clock, which has been initially set for correcting an initial magnification error in the main scanning direction of the image.

16. An image forming apparatus, comprising:

means including a light source and a scanning device for writing image information on a photoconductive body traveling in a sub-scanning direction so as to form an electrostatic image of an image thereupon by driving the light source to emit luminous flux in response to an image signal corresponding to the image information using a write clock and scanning the luminous flux from the light source with the scanning device in a main scanning direction on the photoconductive body;

a developing device configured to develop the electrostatic latent image on the photoconductive body to a toner image;

a selecting device configured to select transfer paper having a size in the main scanning direction;

a transfer device configured to transfer the toner image on the photoconductive body to the selected transfer paper; and write clock reset means for resetting the write clock based on an error in a write position at an image height corresponding to a maximum image width of the image in the main scanning direction such that a magnification error of the writing means in the main scanning direction of the image is corrected.

17. An image forming apparatus according to claim 16, further comprising:

means for detecting the luminous flux from the scanning device for each line of the image at a predetermined position to generate a synchronization detecting signal for the luminous flux for each line of the image; and means for correcting a timing of starting to write the image information for each line of the image on the photoconductive body after detecting the synchronization detecting signal from the detecting means in accordance with the reset write clock such that a write start position for each line of the image is aligned with each other on the photoconductive body.

18. An image forming apparatus according to claim 16, wherein the write clock reset means resets the write clock on the basis of predetermined information of a magnification error characteristics of the writing means to obtain magnification precision at positions corresponding to vicinity of ends of the image having the maximum image width in the main scanning direction.

19. An image forming apparatus according to claim 16, wherein the write clock reset means resets the write clock taking into consideration a correction value for the write clock, which has been initially set for correcting an initial magnification error in the main scanning direction of the image.

20. An image forming apparatus according to claim 16, further comprising:

means for reading an image of a document and producing said image signal;

wherein the write clock reset means recognizes the information of a maximum image width of the image in the main scanning direction from the image signal from the image reading means for each page of the document and resets the write clock on the basis of the information of the maximum image width of the image in the main scanning direction recognized from the image signal from the image reading means for each page of the document.

21. An image forming apparatus according to claim 16, further comprising:

means for pre-scanning and reading an image of a document to produce said image signal;

wherein the write clock reset means recognizes the information of a maximum image width of the image in the main scanning direction on the basis of the image signal obtained by pre-scanning and reading of the document with the image reading means.

22. An image forming apparatus according to claim 16, comprising a memory in which the image signal is stored once, wherein the write clock reset means recognizes the information of a maximum image width of the image in the main scanning direction on the basis of the image signal stored in the memory.

23. A method of forming an image with an image forming apparatus including a writing device configured to write information of an image on a photoconductive body traveling in a sub-scanning direction so as to form an electrostatic latent image of the image thereupon by driving a light source to emit luminous flux, in response to an image signal corresponding to the image information, using a write clock and scanning the luminous flux from the light source with a scanning device in a main scanning direction on the photoconductive body, the method comprising the steps of;

selecting a transfer paper having a size in the main scanning direction; and resetting the write clock on the basis of information of the size of the selected transfer paper in the main scanning direction such that a magnification error of the writing device in the main scanning direction of the image is corrected.

24. A method according to claim 23, further comprising the steps of:

detecting the luminous flux from the scanning device for each line of the image at a predetermined position to generate a synchronization detecting signal for the luminous flux for each line of the image; and correcting a timing of starting to write the image information for each line of the image on the photoconductive body after detecting the synchronization detecting signal in accordance with the reset write clock such that a write start position for each line of the image is aligned with each other on the photoconductive body.

25. A method according to claim 23, wherein the resetting step comprises resetting the write clock on the basis of predetermined information of a magnification error characteristic of the writing device to obtain magnification precision at positions corresponding to vicinity of ends of the selected transfer paper in the main scanning direction.

26. A method according to claim 23, wherein the resetting step comprises resetting the write clock taking into consideration a correction value for the write clock, which has been initially set for correcting an initial magnification error in the main scanning direction of the image.

27. A method of forming an image with an image forming apparatus including a writing device configured to write information of an image on a photoconductive body traveling in a sub-scanning direction so as to form an electrostatic latent image of the image thereupon by driving a light source to emit luminous flux, in response to an image signal corresponding to the image information, using a write clock and scanning the luminous flux from the light source with a scanning device in a main scanning direction on the photoconductive body, the method comprising the step of;

resetting the write clock based on an error in a write position at an image height corresponding to a maximum image width of the image in the main scanning direction such that a magnification error of the writing device in the main scanning direction of the image is corrected.

28. A method according to claim 27, further comprising the steps of:

detecting the luminous flux from the scanning device for each line of the image at a predetermined position to generate a synchronization detecting signal for the luminous flux for each line of the image; and correcting a timing of starting to write the image information of each line of the image on the photoconductive body after detecting the synchronization detecting signal in accordance with the reset write clock such that a write start position for each line of the image is aligned with each other on the photoconductive body.

29. A method according to claim 27, wherein the step of resetting the write clock comprises resetting the write clock on the basis of predetermined information of a magnification error characteristics of the writing device to obtain magnification precision at positions corresponding to vicinity of ends of the image having the maximum image width in the main scanning direction.

30. A method according to claim 27, wherein the step of resetting the write clock comprises resetting the write clock taking into consideration a correction value for the write clock, which has been initially set for correcting an initial magnification error in the main scanning direction of the image.

31. A method according to claim 27, further comprising the step of:

reading an image of a document with a reading device; and recognizing the information of the maximum image width of the image in the main scanning direction from the image signal from the image reading device for each page of the document, where the write clock is reset on the basis of the information of the maximum image width of the image in the main scanning direction recognized from the image signal from the image reading device for each page of the document.

32. A method according to claim 27, further comprising the step of:

pre-scanning and reading an image of a document with a reading device; and recognizing the information of the maximum image width of the image in the main scanning direction on the basis of the image signal obtained by pre-scanning and reading of the document with the image reading device.

33. A method according to claim 27, further comprising the step of;

storing the image signal into a memory once; and recognizing the information of the maximum image width of the image in the main scanning direction on the basis of the image signal stored in the memory.

* * * * *